United States Patent
Zolotushko et al.

(10) Patent No.: US 10,198,342 B1
(45) Date of Patent: Feb. 5, 2019

(54) ADVANCED BINARY INSTRUMENTATION FOR DEBUGGING AND PERFORMANCE ENHANCEMENT

(71) Applicant: PAYPAL, INC., San Jose, CA (US)

(72) Inventors: Artum Zolotushko, Pardess-Hanna (IL); Yuri Shafet, Beer Sheva (IL); Eyal Ben Simon, Givat Elah (IL); Shlomi Boutnaru, Modi'in-Maccabim-Re'ut (IL)

(73) Assignee: PayPal Inc., San Jose, CA (US)

(*) Notice: Subject to any disclaimer, the term of this patent is extended or adjusted under 35 U.S.C. 154(b) by 0 days.

(21) Appl. No.: 15/797,870

(22) Filed: Oct. 30, 2017

(51) Int. Cl.
G06F 9/46 (2006.01)
G06F 11/36 (2006.01)

(52) U.S. Cl.
CPC .......... G06F 11/3644 (2013.01); G06F 9/461 (2013.01)

(58) Field of Classification Search
CPC .............................. G06F 11/3644; G06F 9/461
USPC .................................... 717/124–135; 718/108
See application file for complete search history.

(56) References Cited

U.S. PATENT DOCUMENTS

| | | | | |
|---|---|---|---|---|
| 7,698,692 B1* | 4/2010 | Garud | ................. | G06F 11/3466 714/38.14 |
| 7,890,941 B1* | 2/2011 | Garud | ..................... | G06F 8/443 712/228 |
| 9,521,156 B2 | 12/2016 | Boutnaru et al. | | |
| 2009/0133033 A1* | 5/2009 | Lindo | ................. | G06F 11/3624 718/108 |
| 2012/0198427 A1* | 8/2012 | Schmidt | ................. | G06F 8/443 717/151 |
| 2017/0032120 A1 | 2/2017 | Tolpin et al. | | |

\* cited by examiner

*Primary Examiner* — Qing Chen
(74) *Attorney, Agent, or Firm* — Haynes and Boone, LLP

(57) ABSTRACT

Systems and methods for integrating, into a first software program binary, segments of a second software program are disclosed. The integration causes the execution of segments of the second software program as the first software program binary is executed. In one embodiment, a second software program, such as an embeddable software application, is received and divided into a plurality of segments, each segment corresponding to a portion of the embeddable software application. Instrumentation points corresponding to the segments of the embeddable software application are inserted into a plurality of locations within a software binary to create a modified software binary. The modified software binary thus includes the selected software binary and the embeddable software program.

20 Claims, 4 Drawing Sheets

ADVANCED BINARY INSTRUMENTATION FOR DEBUGGING AND PERFORMANCE ENHANCEMENT

BACKGROUND

Field of the Disclosure

The present disclosure generally relates to computer software, and more particularly, to a method and system for analyzing and monitoring software code segments in various embodiments.

Related Art

Software programs are generally developed by writing source code, from which a binary is ultimately created and executed on a computing device. Binaries are typically (though not always) the form in which software programs are sold and distributed for usage by consumers. As software becomes more a part of daily life, occasions arise when a company or other entity wishes to integrate software with another software program in binary form. However, techniques for integrating two software programs are not suitable for all implementations.

Thus, there is a need for an improved technique of integrating two software programs.

DETAILED DESCRIPTION

Figure 1A:
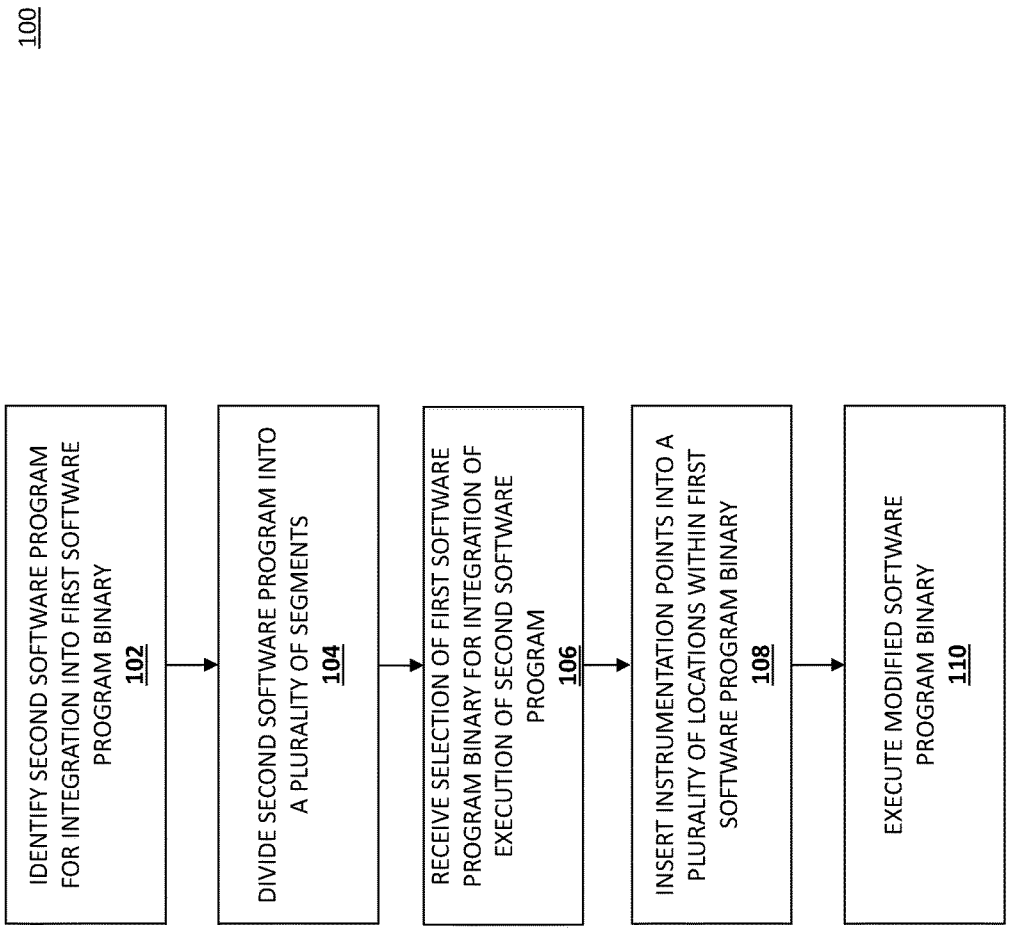
FIG. 1A is a flow chart illustrating an embodiment of a method for integrating a second software program into a first software program.

The present disclosure provides a system and method for integrating or embedding, into the execution of a first software program binary, the execution of segments of a second software program. The integration causes the execution of segments of the second software program as the first software program binary is executed. In one embodiment, a second software program, such as an embeddable software application, is received and divided into a plurality of segments. Each segment corresponds to a portion of the embeddable software application. Responsive to a selection of a software binary, instrumentation points corresponding to, or causing the execution of, the segments of the embeddable software application are inserted into a plurality of locations within the software binary to create a modified software binary. The modified software binary thus includes the selected software binary and the embeddable software program. Inserting the instrumentation points corresponding to the segments causes, during execution of the modified software binary, a context switch from execution of the selected software binary to a segment of the embeddable software application when an instrumentation point is encountered at its inserted location.

Integrating a second software program (e.g., an embeddable software application) into a first software program binary may be useful in many instances. For example, debugging code may be embedded into a software program binary to determine where errors occur during the execution of the software program binary, and may assist programmers in remediating faulty software programs or instrumenting the faulty software program to improve its performance. Similarly, digital rights management code may be inserted into a software program binary to verify that the user or device executing the software program binary has a valid license. Likewise, anti-debugging code or an anti-debugging mechanism can be inserted into a software program binary to protect the software program binary during execution.

Some methods of integrating a second software program into a first software program binary place the entirety of the second software program at a particular location within the first software program binary, for example, at the beginning or end of the first software program binary or roughly within the middle of the first software program binary. However, depending on the purpose of integrating the second software program, such methods may not produce optimal results. For example, a second software program integrated according to such methods may execute all at once, which may cause an undesirable delay in the execution of the first software program binary. Likewise, a second software program integrated according to these methods may be easily detected, which can be undesirable if the second software program is a digital rights management software, as preventing or circumventing the execution of the digital rights management software may allow unauthorized copying or execution of the binary the digital rights management software is intended to protect.

Figure 1B:
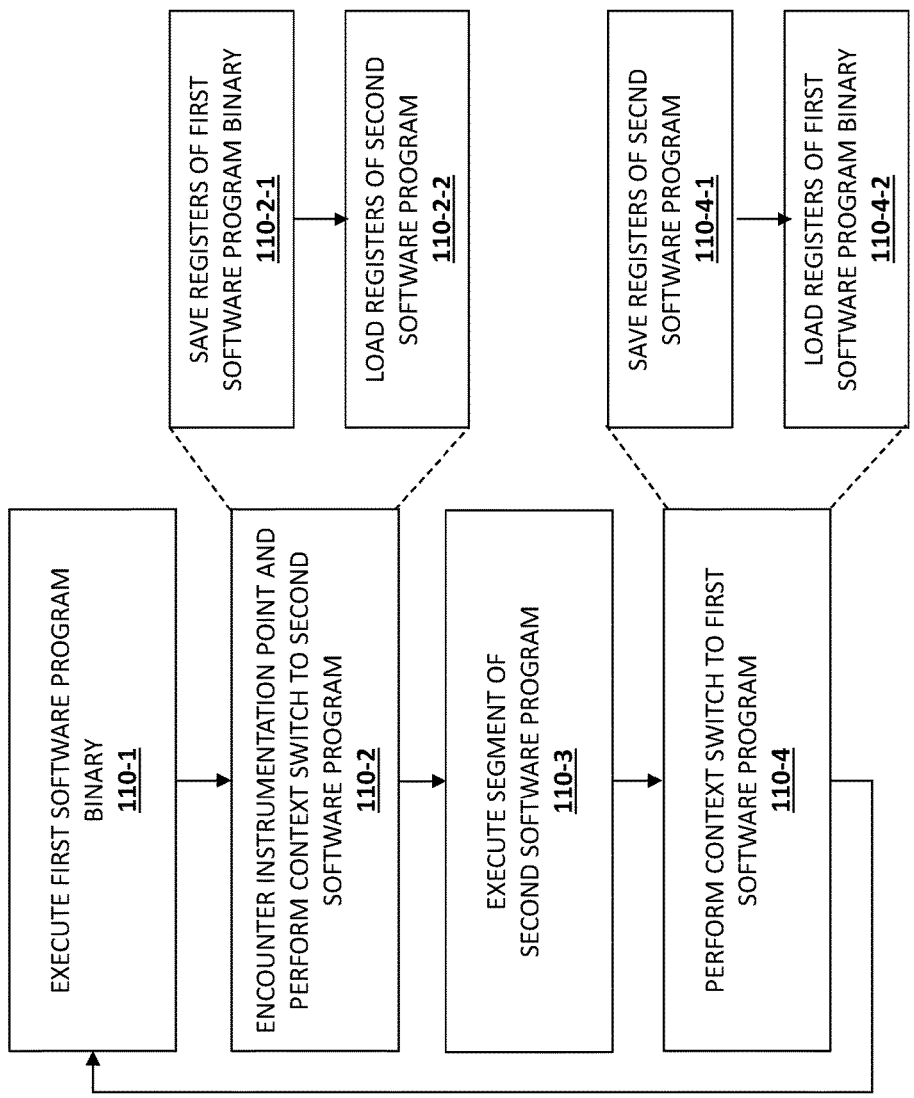
FIG. 1B is a flow chart illustrating an embodiment of a method for executing a modified software binary.

Referring now to FIG. 1, an embodiment of a method 100 for integrating the execution of a second software program into the execution of a first software program binary by creating a modified software program binary is illustrated. In the embodiments and examples discussed below, the first software program binary is described as an image editing application, and the second software program is described as an authentication or verification application. However, other examples of the first software program binary are also possible, such as a word processing software program, spreadsheet software program, presentation software program, web browser software program, data analysis software program, and the like. Likewise, other examples of the second software program are possible, such as digital rights verification applications, system utilities, and debugging tools. In one embodiment of method 100, the source code of the first software program binary is not used in the creation of the modified software program binary.

The method 100 begins at block 102 where a second software program is identified for integration into the execution of a first software program binary. In one embodiment, the second software program is retrieved from storage on a system which includes a plurality of software programs, and the second software program is retrieved over a network. In one embodiment, the first software program binary is intended for distribution to one or more end users for deployment and execution on the users' systems, and is retrieved from another system which includes a plurality of software programs. In one embodiment, based on the identification of the second software program, the second software program is transmitted to and received by a computing system which performs the integration into the execution of the first software program binary. In one embodiment, the second software program is transmitted over a network to the computing system which performs the integration.

Method 100 then proceeds to block 104. At block 104, the second software program is divided into a plurality of segments. Each segment into which the second software program is divided corresponds to a portion of the second software program. In one embodiment, each segment of the second software program includes one or more individual or elemental commands of the second software program. For example, a first segment may be an open file command, a second segment may be a read command, a third segment may be a write command, and so on. In one embodiment, each segment of the second software program includes multiple elemental commands. For example, a first segment may include an open file and read command, while a second segment may include a write command and close file command.

In one embodiment, code of the second software program is analyzed to determine how the second software program is to be divided into segments. For example, the second software program may be tested to determine the duration of execution for each operation, and each segment may include a number of operations based on their duration of execution. Additionally or alternatively, the code of the second software program may include comments or other identifiers to control how the second software program is divided into segments. In one embodiment, the second software program may not be divided into a plurality of segments, but rather, its execution occurs in segments based on the insertion of instrumentation points causing the execution of portions of the second software program. Thus, portions of a second software program may be denoted or identified as a particular segment, without actually dividing the second software program itself.

Method 100 then proceeds to block 106. At block 106, a selection of a first software program binary is received. As detailed above, the first software program binary may be intended for distribution to one or more end users for deployment and execution on the users' systems. In one embodiment, the first software program binary is already resident on the users' systems, and the second software program is integrated into the copy of the first software program binary on each user's system (e.g., for debugging purposes).

Method 100 then proceeds to block 108. At block 108, responsive to the selection of the first software program binary, a plurality of instrumentation points which correspond to, and which may cause the execution of, segments of the second software program are inserted into a plurality of locations within the first software program binary. In one embodiment, insertion of the plurality of instrumentation points corresponding to the execution of segments of the second software program creates a modified software program binary which includes the first software program binary, the instrumentation points, and the second software program. In one embodiment, one or more references to the second software program are inserted into a plurality of locations within the first software program binary. The one or more instrumentation points may cause execution of a management process, as will be further described below.

Method 100 then proceeds to block 110. At block 110, the modified software program binary is executed, for example, on a user's computer system. Execution of the modified software binary is described in more detail in FIG. 3. At block 110-1 of step 110, execution of the modified software binary may begin with execution of the first software program binary. At some point in execution of the modified software binary, an instrumentation point may be encountered, with reference to block 110-2. At that point, a context switch may occur, which causes the computer system to temporarily pause the execution of the first software program binary and instead execute a segment of the second software program. In one embodiment, an instrumentation point inserted into the first software program binary triggers the context switch and the execution of the segment of the second software program. In one embodiment, context switching from the execution of the first software program binary to the execution of the second software program operates in a similar manner to operating system multitasking. In one embodiment, the execution of the first software program binary and second software program do not occur in parallel.

In one embodiment, when an instrumentation point corresponding to a segment of the second software program is encountered during execution of the modified software binary, the instrumentation point may cause the execution of code that performs a context switch to execution of a segment of the second software program. Thus, block 110 proceeds to block 110-2-1, where registers of the first software program binary are saved, or pushed, onto a stack to maintain the data. Registers corresponding to the second software program are then loaded into memory at block 110-2-2. Block 110 then proceeds to block 110-3, where a segment of the second software program is executed. Once the segment is executed, block 110 proceeds to perform a context switch back to execution of the first software program, at block 110-4. Furthermore, as part of block 110-4, the registers of the second software program are saved, or pushed, onto a stack to maintain that data at block 110-4-1. In one embodiment, the registers of the second software program are saved in a stack different than that of the first software program binary. The registers of the first software program binary are then loaded again at block 110-4-2, and execution of the first software program binary resumes with reference to block 110-1. In one embodiment, a management process or mechanism is responsible for saving the registers of the first software program binary, loading the registers of the second software program, later saving the registers of the second software program, and then loading the registers of the first software program binary again. That is, the management process may be responsible for performing a context switch from execution of the first software program binary to execution of a segment of the second software program as described with reference to block 110 and FIG. 3.

In one embodiment, execution of an initial segment of the second software program causes the allocation of a separate stack for the second software program, to maintain data of the second software program, for example, in the process mentioned above. In one embodiment, the stack is allocated in a different memory zone or area of memory than what is being utilized by the first software program binary, such that execution of the second software program does not interfere with the execution or the stack for the first software program binary. Allocation of the stack for the second software program may be one of the first operations undertaken when the first segment of the second software program is executed. In one embodiment, the address of the last eight bytes of the data segment for the first software program binary is saved and utilized in allocating the stack for the second software program.

As described above, instrumentation points may be inserted into the first software program binary to cause execution of segments of the second software program. When an instrumentation point is encountered, a management process or mechanism is invoked or called, which causes execution of a segment of the second software program. In one embodiment, the management process may keep a record of which segments of the second software program have been executed, and may ensure that the segments of the second software program are executed in order.

In one embodiment, the number of instrumentation points inserted into the first software program binary is greater than the number of segments of the second software program. This may be useful, in one example, if portions of the first software program binary in which instrumentation points are inserted are not executed. For example, an instrumentation point may be inserted into a portion of a first software program binary which executes when a user selects a menu option in a graphical user interface presented by the first software program binary. If the user does not select that menu option, that instrumentation point is never encountered, and thus, a segment of the second software program is not executed. However, if a greater number of instrumentation points is inserted into the first software program binary, then a subsequent instrumentation point may be encountered during the user's interaction with the first software program binary, and that subsequent instrumentation point causes execution of the segment of the second software program. In one embodiment, as described above, when an instrumentation point is encountered, a management process is called to determine the appropriate segment of the second software program to execute. Thus, additional instrumentation points may be inserted into the first software program binary, such that all segments of the second software program are executed. For example, while the second software program may be divided into five (5) segments, fifteen (15) (or more or less) instrumentation points may be inserted into the first software program binary to improve (or guarantee) that all segments of the second software program are executed.

In one embodiment, the management process also ensures that each segment of the second software program only executes once. That is, the management process maintains a record of the segments that have executed. When the management process is invoked based on an instrumentation point being encountered, the management process determines the segments that have been executed, and only executes segments of the second software program which have not yet executed. In this manner, segments of the second software program are not executed multiple times.

In one embodiment, instrumentation points corresponding to execution of segments of the second software program are distributed evenly throughout the first software program binary; for example, instrumentation points may be inserted at every 5,000 offsets (or any other number). In one embodiment, instrumentation points corresponding to execution of segments of the second software program are distributed in another manner, for example, randomly throughout the first software program binary, or with a multiple offset value (e.g., the first instrumentation point may be inserted at offset 5,000, the second at offset 15,000 (the initial offset plus twice the previous offset value), and the third at offset 45,000). In one embodiment, instrumentation points corresponding to execution of segments of the second software program are inserted intelligently into the first software program binary. For example, instrumentation points may not be inserted into portions of the first software program binary that may cause crashes or other undesirable behavior of the first software program binary. Similarly, certain flows of the first software program binary may not be optimal locations for inserting instrumentation points corresponding to execution of segments of the second software program, based on testing or debugging.

As described above, a potential use of method 100 and the embodiments disclosed herein is digital rights management or verification of a software binary. For example, a digital rights checking program may be inserted throughout a word processing program binary. As the word processing program binary is executed, segments of the digital rights checking program are executed, based on an instrumentation point being encountered, to continually verify that the word processing program binary executing on the user's computer is an authorized copy of the binary. In another example, a software program that checks the memory usage of a binary program may be inserted into the binary program, to monitor the performance of the binary program and make sure that the binary program does not exceed a threshold amount of memory usage during execution.

In one embodiment, instrumentation points corresponding to execution of segments of the embeddable software application are inserted within the original software binary at locations in which a delay in execution of the original software binary is expected. For example, during execution of an original software binary, the software application may enter a state in which it is expecting input from a user, or the software application may enter a state in which it is printing a document. Delays in further execution of the original software binary are unlikely to be noticed by a user, and thus, may be identified as appropriate locations in which a context switch may occur to execution of a segment of an embeddable software application (e.g., to verify that the original software binary is an authorized copy). Once the segment of the embeddable software application is executed, a context switch again occurs to return to execution of the original software application, without any delay being perceived by a user.

In one embodiment, the management process, or another portion of the second software program, modifies a histogram of the system calls for the first software program binary. Modifying the histogram of the system calls may assist the second software program in evading detection by, for example, programs which seek to circumvent digital rights management programs.

Thus, a system and method for augmenting a software program binary by integrating the execution of a second software program are disclosed that permit execution of the second software program at various times and/or locations throughout the execution of the software program binary, without execution of the second software program all at one time. The systems and methods of the present disclosure provide substantial benefits over conventional solutions, such as the ability for the second software program to execute at times in which a delay of the software program binary is expected, the ability for the second software program to execute with minimal perceived impact to users while protecting the provider of the software program binary (e.g., to ensure only authorized copies are being used), increased ability for the second software program to execute periodically to collect data for use in debugging purposes or verification purposes, and the ability for a computer system to integrate a second software program with a first software program binary without access to the first software program binary source code.

Figure 2:
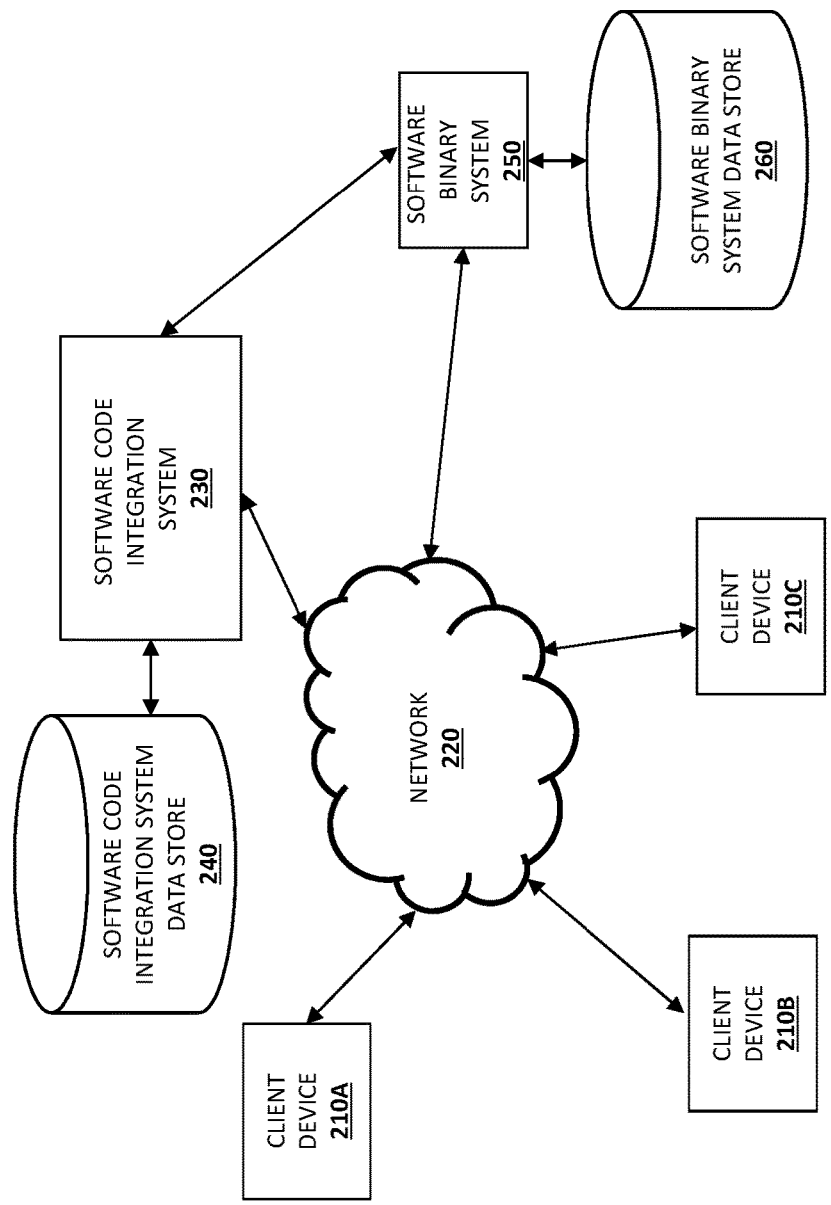
FIG. 2 is a schematic view illustrating an embodiment of a networked system.

Referring now to FIG. 2, an embodiment of a networked system 200 for implementing one or more processes described herein is illustrated. As shown, network-based system 200 may comprise or implement a plurality of servers, computing devices, and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 2 may be deployed in other ways and that the operations performed and/or the services provided by such servers may be combined or separated for a given implementation and may be performed by a greater number or fewer number of servers. One or more servers or computing devices may be operated and/or maintained by the same or different entities.

The networked system 200 includes one or more client devices 210a-210c that are coupled to a network 220. A software code integration system 230 is also coupled to network 220 and a software code integration system data store 240. Software code integration system 230 may also be coupled to a software binary system 250. In some embodiments, software binary system 250 may be coupled directly to network 220, or may be coupled to network 220 through software code integration system 230 as shown. Software binary system 250 may also be coupled to software binary system data store 260.

The client devices, software code integration system, and software binary system may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 200, and/or accessible over the network 220.

The client devices 210 may be implemented using any appropriate combination of hardware and/or software configured for wired and/or wireless communication over network 220. For example, in one embodiment, the client devices 210 may be implemented as a personal computer of a user in communication with the Internet. In other embodiments, the client devices 210 may be smart phones, laptop computers, wearable computing devices, and/or other types of computing devices.

The client devices 210 may include one or more browser applications which may be used, for example, to provide a convenient interface to permit users to browse information available over the network 220. For example, in one embodiment, the browser application may be implemented as a web browser configured to view information available over the Internet.

The client devices 210 may also include one or more software applications which may be used, for example, to provide user-side processing for performing desired tasks in response to operations selected by the user. The client devices 210 may further include other applications as may be desired in particular embodiments to provide desired features to the client devices 210. The other applications may include security applications for implementing user-side security features, programmatic user applications for interfacing with appropriate application programming interfaces (APIs) over the network 220, or other types of applications. Email and/or text applications may also be included, which allow the user to send and receive emails and/or text messages through the network 220. The client devices 210 include one or more user and/or device identifiers which may be implemented, for example, as operating system registry entries, cookies associated with the browser application, identifiers associated with hardware of the client devices 210, or other appropriate identifiers, such as a phone number. The client devices 210 may be configured to execute software program binaries, such as modified software program binaries, as described above with reference to blocks 110-1 through 110-4.

The network 220 may be implemented as a single network or a combination of multiple networks. For example, in various embodiments, the network 220 may include the Internet and/or one or more intranets, landline networks, local area networks, wide area networks, wireless networks, and/or other appropriate types of networks.

Software code integration system 230 may manage and perform integration of a second software program into a first software program binary, as described above with reference to blocks 102-110 of method 100. Software code integration system 230 may retrieve software code for integration from software code integration system data store 240, and may receive binaries from software binary system 250 and/or software binary system data store 260. In some embodiments, software code integration system 230 operates in conjunction with one or more client devices 210a-210c to perform integration of a second software program into a first software program binary resident on the client devices 210a-210c.

Software binary system 250 may store one or more software binaries for distribution or execution by client devices 210a-210c. Software binary system data store 260 may be utilized by software binary system 250 to store data, including software binaries.

Figure 3:
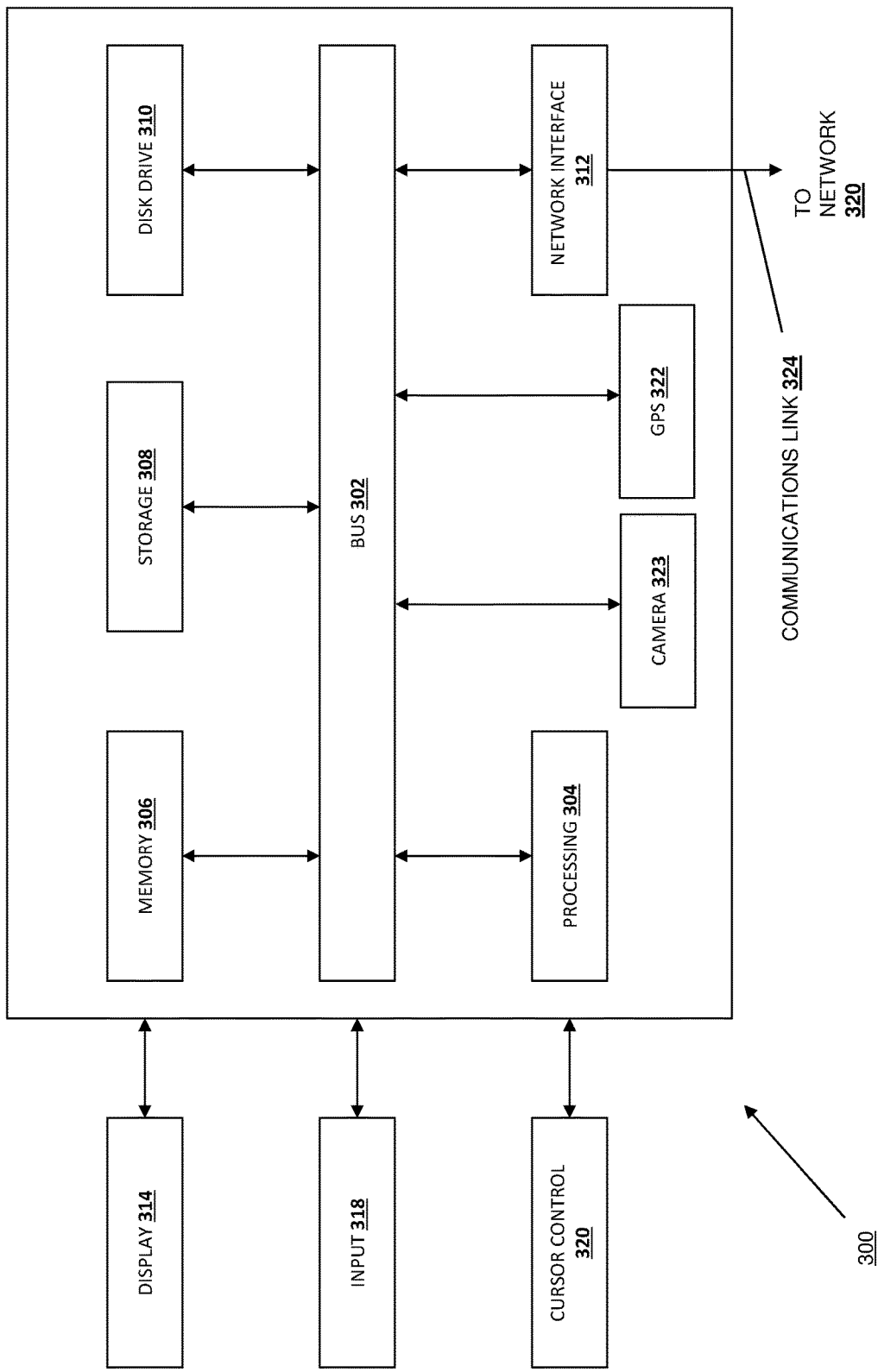
FIG. 3 is a schematic view illustrating an embodiment of a computing device; and Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

Referring now to FIG. 3, an embodiment of a computer system 300 suitable for implementing, for example, the client devices 210a-210c, the software code integration system 230, and/or the software binary system 250, is illustrated. It should be appreciated that other devices utilized in the system discussed above may be implemented as the computer system 300 in a manner as follows.

In accordance with various embodiments of the present disclosure, computer system 300, such as a computer and/or a network server, includes a bus 302 or other communication mechanism for communicating information, which interconnects subsystems and components, such as a processing component 304 (e.g., processor, micro-controller, digital signal processor (DSP), etc.), a system memory component 306 (e.g., RAM), a static storage component 308 (e.g., ROM), a disk drive component 310 (e.g., magnetic or optical), a network interface component 312 (e.g., modem or Ethernet card), a display component 314 (e.g., CRT or LCD), an input component 318 (e.g., keyboard, keypad, or virtual keyboard), a cursor control component 320 (e.g., mouse, pointer, or trackball), and/or a location determination component 322 (e.g., a Global Positioning System (GPS) device as illustrated, a cell tower triangulation device, and/or a variety of other location determination devices known in the art.) In one implementation, the disk drive component 310 may comprise a database having one or more disk drive components.

In accordance with embodiments of the present disclosure, the computer system 300 performs specific operations by the processor 304 executing one or more sequences of instructions contained in the memory component 306, such as described herein with respect to the client devices 210a-

210c, the software code integration system 230, and/or the software binary system 250. Such instructions may be read into the system memory component 306 from another computer readable medium, such as the static storage component 308 or the disk drive component 310. In other embodiments, hard-wired circuitry may be used in place of or in combination with software instructions to implement the present disclosure.

Logic may be encoded in a computer readable medium, which may refer to any medium that participates in providing instructions to the processor 304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 310, volatile media includes dynamic memory, such as the system memory component 306, and transmission media includes coaxial cables, copper wire, and fiber optics, including wires that comprise the bus 302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 300. In various other embodiments of the present disclosure, a plurality of the computer systems 300 coupled by a communication link 324 to the network 220 (e.g., such as a LAN, WLAN, PTSN, and/or various other wired or wireless networks, including telecommunications, mobile, and cellular phone networks) may perform instruction sequences to practice the present disclosure in coordination with one another.

The computer system 300 may transmit and receive messages, data, information and instructions, including one or more programs (i.e., application code) through the communication link 324 and the network interface component 312. The network interface component 312 may include an antenna, either separate or integrated, to enable transmission and reception via the communication link 324. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A software integration system, comprising:
a memory storing a plurality of software program binaries; and
one or more hardware processors coupled to the memory and configured to read instructions to cause the software integration system to perform operations comprising:
identifying an embeddable software program for integration into execution of a software program binary;
dividing the embeddable software program into a plurality of segments, each segment of the plurality of segments of the embeddable software program corresponding to a portion of the embeddable software program;
receiving a selection of a software program binary in the plurality of software program binaries; and
responsive to receiving the selection of the software program binary in the plurality of software program binaries, inserting, into a plurality of locations within the selected software program binary, a plurality of instrumentation points corresponding to the plurality of segments of the embeddable software program to create a modified software program binary which includes the selected software program binary and the embeddable software program,
wherein inserting the plurality of instrumentation points causes, during execution of the modified software program binary, a context switch from execution of the selected software program binary to execution of respective ones of the plurality of segments of the embeddable software program when an instrumentation point of the plurality of instrumentation points is encountered at a corresponding inserted location of the plurality of inserted locations within the modified software program binary.

2. The software integration system of claim 1, wherein inserting the plurality of instrumentation points corresponding to the plurality of segments of the embeddable software program causes, during execution of the modified software program binary, an allocation of a memory stack for the embeddable software program.

3. The software integration system of claim 1, wherein the operations further comprise:
when an instrumentation point is encountered at a corresponding location within the modified software program binary:

saving a plurality of memory registers corresponding to the execution of the selected software program binary;

loading a plurality of memory registers corresponding to execution of a segment of the embeddable software program;

performing a first context switch to the execution of the segment of the embeddable software program;

executing the segment of the embeddable software program;

saving a plurality of memory registers corresponding to the execution of the segment of the embeddable software program;

loading a plurality of memory registers corresponding to the execution of the selected software program binary; and performing a second context switch to the execution of the selected software program binary.

4. The software integration system of claim 1, wherein the operations further comprise:

executing a management process corresponding to the embeddable software program, wherein the management process is configured to:

during execution of the modified software program binary, and based on a notification that an inserted instrumentation point has been encountered, determine whether a first segment of the embeddable software program has been executed; and responsive to the determination that the first segment of the embeddable software program has been executed, execute a second segment of the embeddable software program.

5. The software integration system of claim 1, wherein a number of the inserted plurality of instrumentation points is greater than a number of the plurality of segments into which the embeddable software program is divided.

6. The software integration system of claim 1, wherein the embeddable software program is a digital rights management program.

7. A method for creating a software program, comprising:

identifying an embeddable software program for integration into execution of a software program binary;

dividing the embeddable software program into a plurality of segments, each segment of the plurality of segments of the embeddable software program corresponding to a portion of the embeddable software program;

receiving a selection of a software program binary in the plurality of software program binaries; and responsive to receiving the selection of the software program binary in the plurality of software program binaries, inserting, into a plurality of locations within the selected software program binary, a plurality of instrumentation points corresponding to the plurality of segments of the embeddable software program to create a modified software program binary which includes the selected software program binary and the embeddable software program, wherein inserting the plurality of instrumentation points causes, during execution of the modified software program binary, a context switch from execution of the selected software program binary to execution of respective ones of the plurality of segments of the embeddable software program when an instrumentation point of the plurality of instrumentation points is encountered at a corresponding inserted location of the plurality of inserted locations within the modified software program binary.

8. The method of claim 7, wherein inserting the plurality of instrumentation points corresponding to the plurality of segments of the embeddable software program causes, during execution of the modified software program binary, an allocation of a memory stack for the embeddable software program.

9. The method of claim 7, further comprising:

when an instrumentation point is encountered at a corresponding location within the modified software program binary:

saving a plurality of memory registers corresponding to the execution of the selected software program binary;

loading a plurality of memory registers corresponding to execution of a segment of the embeddable software program;

performing a first context switch to the execution of the segment of the embeddable software program;

executing the segment of the embeddable software program;

saving a plurality of memory registers corresponding to the execution of the segment of the embeddable software program;

loading a plurality of memory registers corresponding to the execution of the selected software program binary; and performing a second context switch to the execution of the selected software program binary.

10. The method of claim 7, further comprising executing a management process corresponding to the embeddable software program, wherein the management process is configured to:

during execution of the modified software program binary, and based on a notification that an inserted instrumentation point has been encountered, determine whether a first segment of the embeddable software program has been executed; and responsive to the determination that the first segment of the embeddable software program has been executed, execute a second segment of the embeddable software program.

11. The method of claim 7, wherein a number of the inserted plurality of instrumentation points is greater than a number of the plurality of segments into which the embeddable software program is divided.

12. The method of claim 7, wherein the embeddable software program is a digital rights management program.

13. The method of claim 7, wherein each location in the plurality of locations into which the plurality of instrumentation points is inserted is based on an identification of an expected delay in execution of the selected software program binary.

14. A non-transitory computer readable medium having stored thereon computer readable instructions executable to cause a computer to perform operations comprising:

identifying an embeddable software program for integration into execution of a software program binary;

dividing the embeddable software program into a plurality of segments, each segment of the plurality of segments of the embeddable software program corresponding to a portion of the embeddable software program;

receiving a selection of a software program binary in the plurality of software program binaries; and responsive to receiving the selection of the software program binary in the plurality of software program binaries, inserting, into a plurality of locations within the selected software program binary, a plurality of instrumentation points corresponding to the plurality of segments of the embeddable software program to create a modified software program binary which includes the selected software program binary and the embeddable software program, wherein inserting the plurality of instrumentation points causes, during execution of the modified software program binary, a context switch from execution of the selected software program binary to execution of respective ones of the plurality of segments of the embeddable software program when an instrumentation point of the plurality of instrumentation points is encountered at a corresponding inserted location of the plurality of inserted locations within the modified software program binary.

15. The non-transitory computer readable medium of claim 14, wherein inserting the plurality of instrumentation points corresponding to the plurality of segments of the embeddable software program causes, during execution of the modified software program binary, an allocation of a memory stack for the embeddable software program.

16. The non-transitory computer readable medium of claim 14, wherein the operations further comprise:

when an instrumentation point is encountered at a corresponding location within the modified software program binary:
saving a plurality of memory registers corresponding to the execution of the selected software program binary;
loading a plurality of memory registers corresponding to execution of a segment of the embeddable software program;
performing a first context switch to the execution of the segment of the embeddable software program;
executing the segment of the embeddable software program;
saving a plurality of memory registers corresponding to the execution of the segment of the embeddable software program;
loading a plurality of memory registers corresponding to the execution of the selected software program binary; and
performing a second context switch to the execution of the selected software program binary.

17. The non-transitory computer readable medium of claim 14, wherein the operations further comprise executing a management process corresponding to the embeddable software program, and wherein the management process is configured to:

during execution of the modified software program binary, and based on a notification that an inserted instrumentation point has been encountered, determine whether a first segment of the embeddable software program has been executed; and responsive to the determination that the first segment of the embeddable software program has been executed, execute a second segment of the embeddable software program.

18. The non-transitory computer readable medium of claim 14, wherein a number of the inserted plurality of instrumentation points is greater than a number of the plurality of segments into which the embeddable software program is divided.

19. The non-transitory computer readable medium of claim 14, wherein the embeddable software program is a digital rights management program.

20. The non-transitory computer readable medium of claim 14, wherein each location in the plurality of locations into which the plurality of instrumentation points is inserted is based on an identification of an expected delay in execution of the selected software program binary.

* * * * *